United States Patent
Harris, III et al.

(10) Patent No.: US 8,907,596 B2
(45) Date of Patent: Dec. 9, 2014

(54) METHOD AND SYSTEM FOR CONTROLLING ELECTRIC MOTORS OF A COMMON ASSEMBLY

(75) Inventors: Troy W. Harris, III, Charlotte, NC (US); Jacob Kallara, Morrisville, NC (US)

(73) Assignee: Deere & Company, Moline, IL (US)

( * ) Notice: Subject to any disclaimer, the term of this patent is extended or adjusted under 35 U.S.C. 154(b) by 176 days.

(21) Appl. No.: 13/460,865

(22) Filed: May 1, 2012

(65) Prior Publication Data

US 2013/0293167 A1 Nov. 7, 2013

(51) Int. Cl.
*H02P 5/46* (2006.01)
(52) U.S. Cl.
USPC .................. 318/77; 318/53; 318/112; 318/50; 318/67; 318/70
(58) Field of Classification Search
USPC .............................. 318/50, 53, 67, 70, 77, 112
See application file for complete search history.

(56) References Cited

U.S. PATENT DOCUMENTS

| | | | |
|---|---|---|---|
| 3,838,321 A * | 9/1974 | Damm et al. | 318/66 |
| 4,524,316 A | 6/1985 | Brown et al. | |
| 5,490,370 A | 2/1996 | McNair et al. | |
| 6,591,593 B1 | 7/2003 | Brandon et al. | |
| 6,856,035 B2 | 2/2005 | Brandon et al. | |
| 7,248,005 B2 | 7/2007 | Makaran | |
| 2004/0066156 A1 | 4/2004 | Makaran et al. | |
| 2009/0201650 A1 * | 8/2009 | Hauser et al. | 361/736 |
| 2009/0222175 A1 | 9/2009 | Henson | |
| 2010/0125384 A1 | 5/2010 | Wyatt et al. | |
| 2010/0253271 A1 * | 10/2010 | Godbold et al. | 318/459 |
| 2012/0109440 A1 | 5/2012 | Wyatt et al. | |

FOREIGN PATENT DOCUMENTS

JP 2007037366 A 2/2007

* cited by examiner

*Primary Examiner* — Eduardo Colon Santana
*Assistant Examiner* — Bickey Dhakal

(57) ABSTRACT

A first motor controller generates commanded speeds of a first rotor of a first electric motor for a first time interval and a second time interval. A first speed monitor detects observed speeds of the first rotor for the time intervals. A first ratio is determined based on a relationship between respective commanded speeds and corresponding observed speeds for the first time interval and the second time interval. A first data processor increments a persistence counter for the first motor if the first ratio increases or changes during the time intervals. A first motor deceleration is estimated if the persistence counter exceeds a stall limit count. A target rotor speed of a second motor is adjusted based on the estimated first motor rate of change to track the first motor rate of change (or first rotor speed) if the persistence counter exceeds the stall limit count.

21 Claims, 8 Drawing Sheets

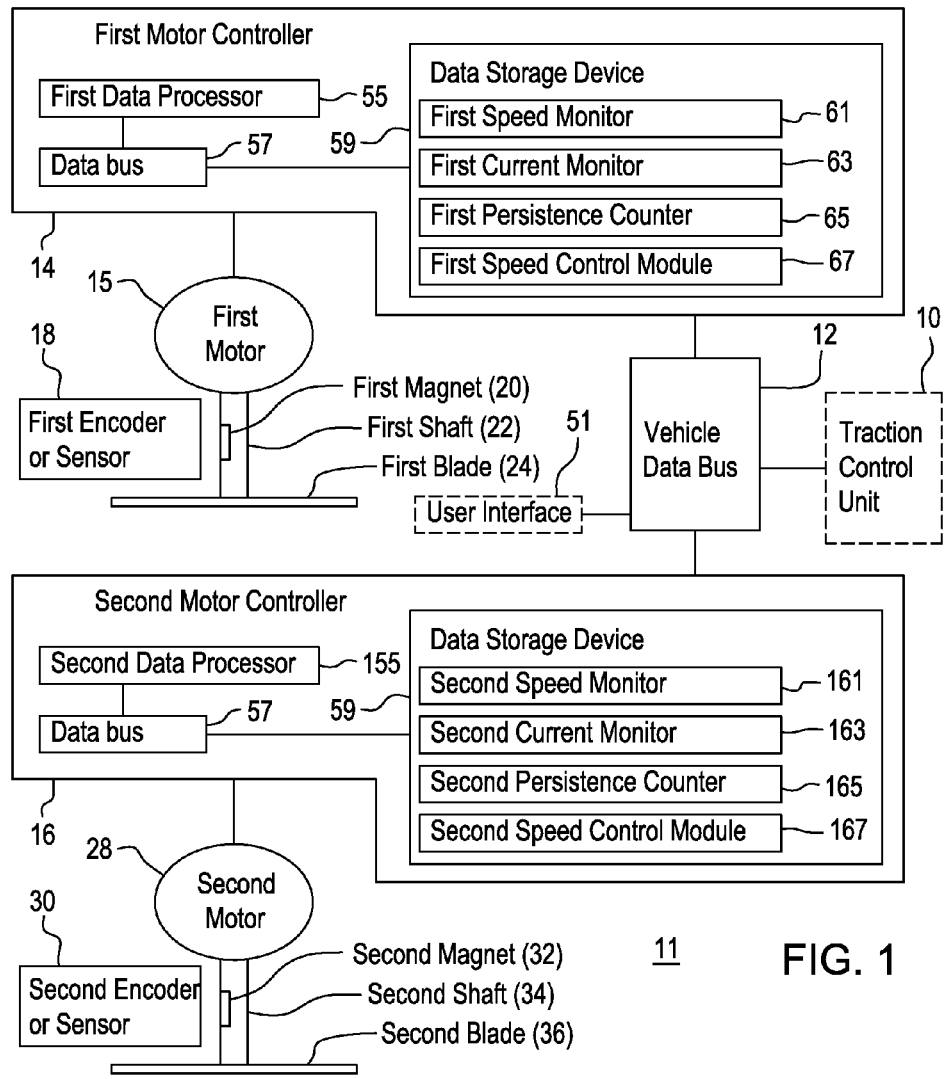
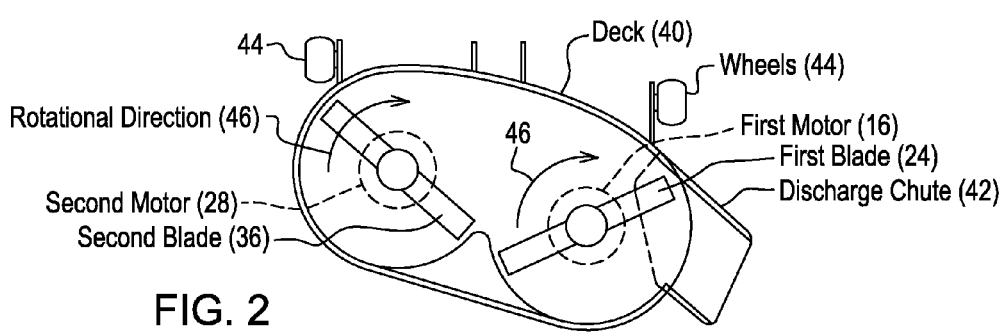
FIG. 1
FIG. 2

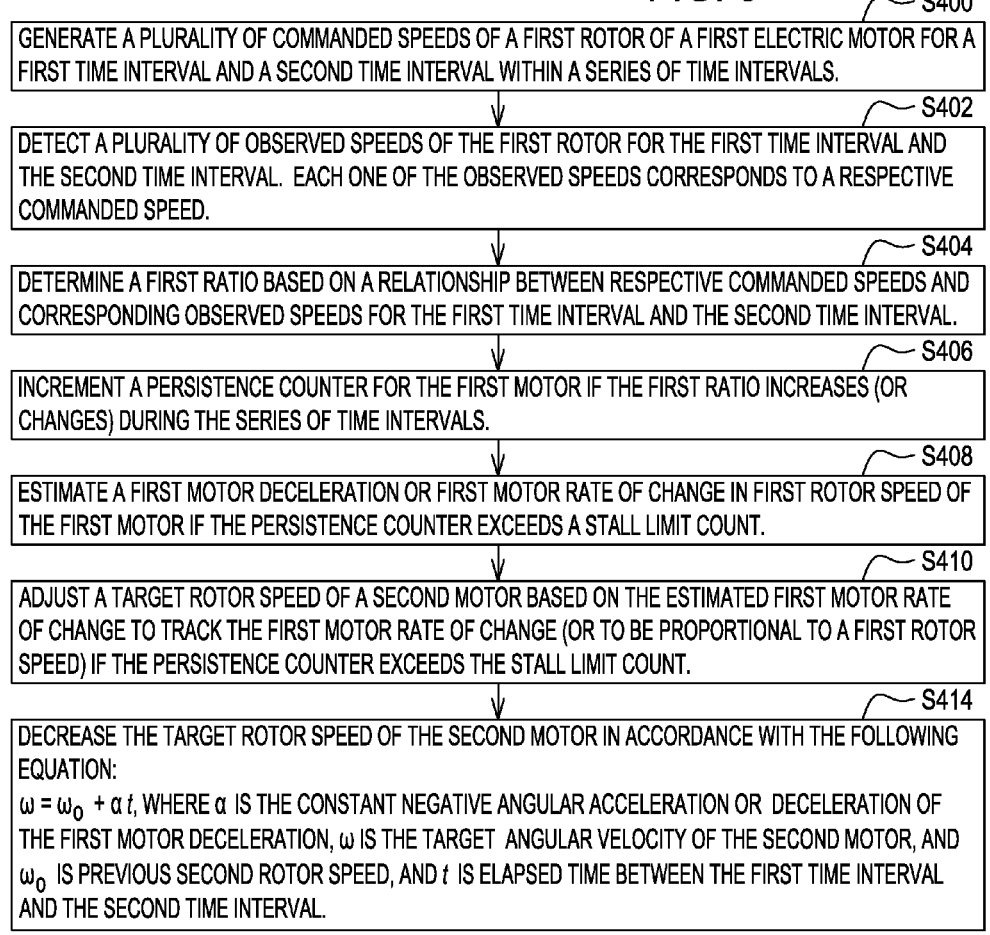

FIG. 6

S400 — GENERATE A PLURALITY OF COMMANDED SPEEDS OF A FIRST ROTOR OF A FIRST ELECTRIC MOTOR FOR A FIRST TIME INTERVAL AND A SECOND TIME INTERVAL WITHIN A SERIES OF TIME INTERVALS.

S402 — DETECT A PLURALITY OF OBSERVED SPEEDS OF THE FIRST ROTOR FOR THE FIRST TIME INTERVAL AND THE SECOND TIME INTERVAL. EACH ONE OF THE OBSERVED SPEEDS CORRESPONDS TO A RESPECTIVE COMMANDED SPEED.

S404 — DETERMINE A FIRST RATIO BASED ON A RELATIONSHIP BETWEEN RESPECTIVE COMMANDED SPEEDS AND CORRESPONDING OBSERVED SPEEDS FOR THE FIRST TIME INTERVAL AND THE SECOND TIME INTERVAL.

S406 — INCREMENT A PERSISTENCE COUNTER FOR THE FIRST MOTOR IF THE FIRST RATIO INCREASES (OR CHANGES) DURING THE SERIES OF TIME INTERVALS.

S408 — ESTIMATE A FIRST MOTOR DECELERATION OR FIRST MOTOR RATE OF CHANGE IN FIRST ROTOR SPEED OF THE FIRST MOTOR IF THE PERSISTENCE COUNTER EXCEEDS A STALL LIMIT COUNT.

S410 — ADJUST A TARGET ROTOR SPEED OF A SECOND MOTOR BASED ON THE ESTIMATED FIRST MOTOR RATE OF CHANGE TO TRACK THE FIRST MOTOR RATE OF CHANGE (OR TO BE PROPORTIONAL TO A FIRST ROTOR SPEED) IF THE PERSISTENCE COUNTER EXCEEDS THE STALL LIMIT COUNT.

S414 — DECREASE THE TARGET ROTOR SPEED OF THE SECOND MOTOR IN ACCORDANCE WITH THE FOLLOWING EQUATION:
$\omega = \omega_0 + \alpha t$, WHERE $\alpha$ IS THE CONSTANT NEGATIVE ANGULAR ACCELERATION OR DECELERATION OF THE FIRST MOTOR DECELERATION, $\omega$ IS THE TARGET ANGULAR VELOCITY OF THE SECOND MOTOR, AND $\omega_0$ IS PREVIOUS SECOND ROTOR SPEED, AND $t$ IS ELAPSED TIME BETWEEN THE FIRST TIME INTERVAL AND THE SECOND TIME INTERVAL.

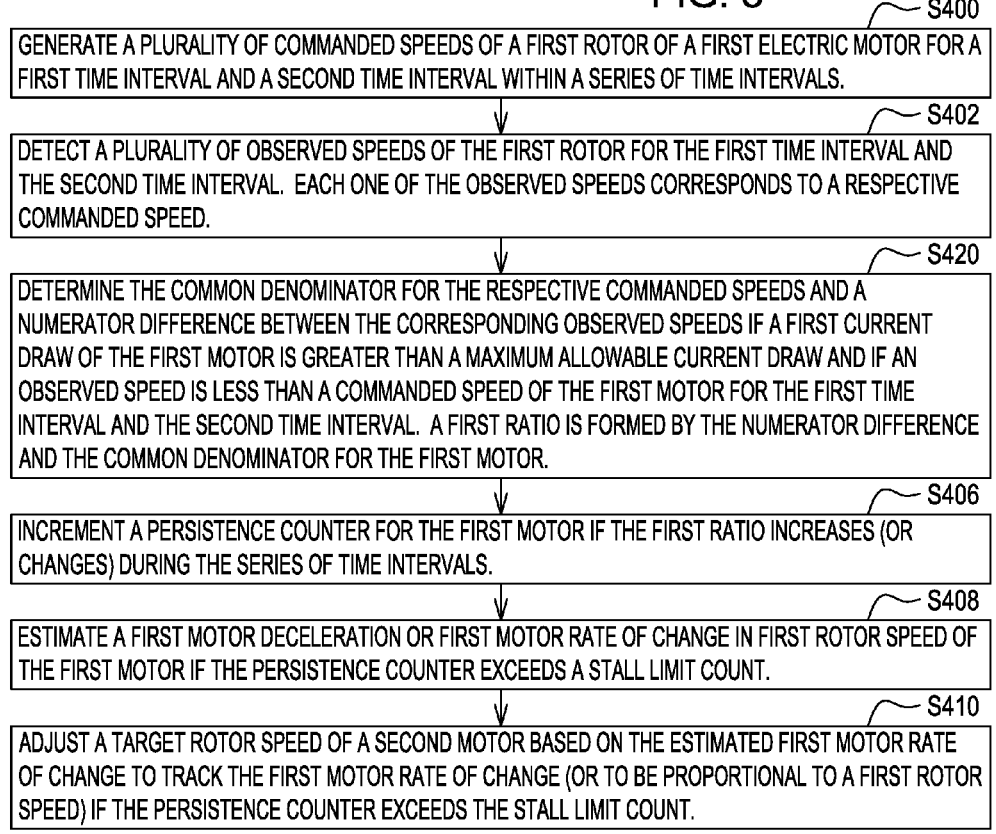

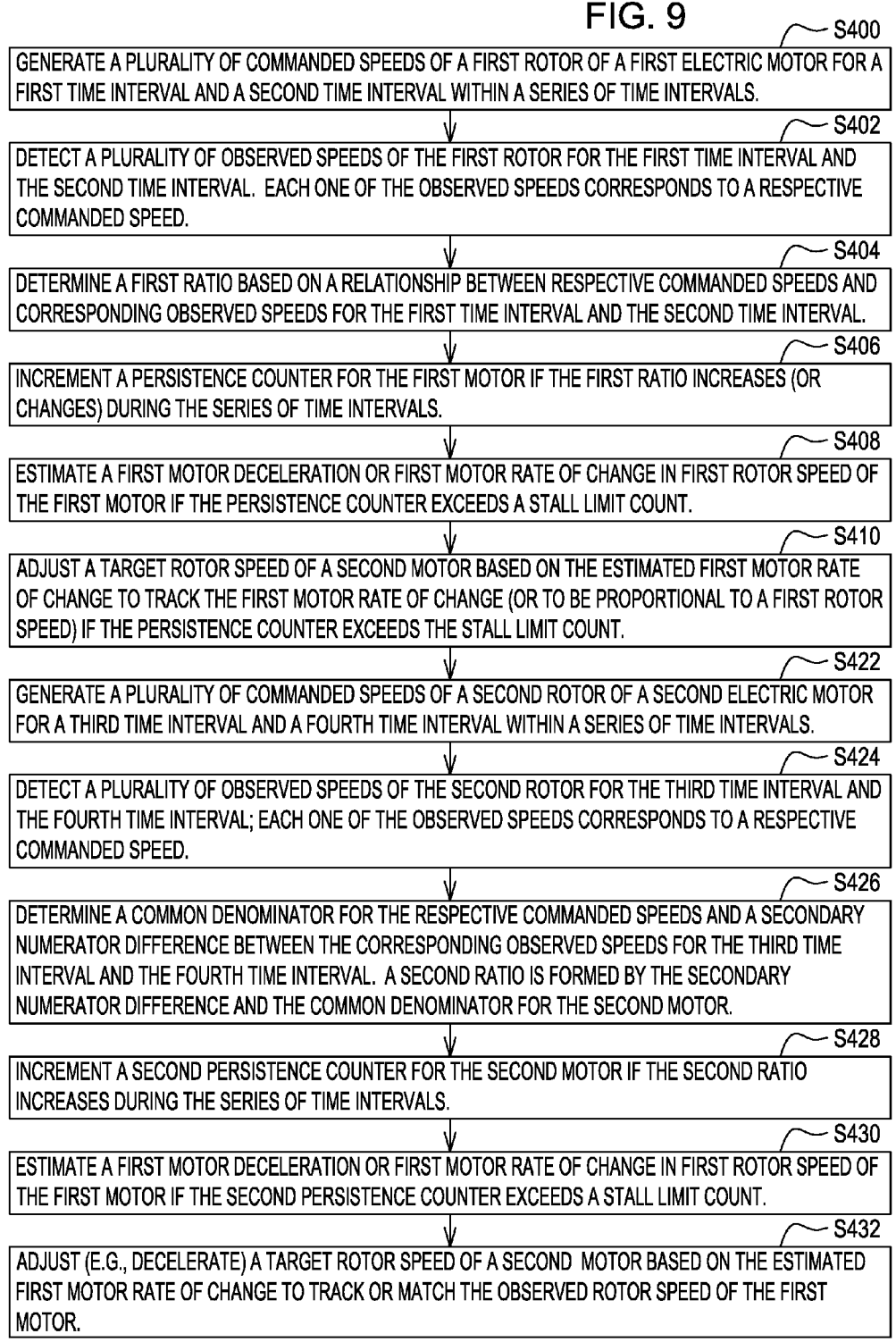

US 8,907,596 B2

METHOD AND SYSTEM FOR CONTROLLING ELECTRIC MOTORS OF A COMMON ASSEMBLY

FIELD OF THE INVENTION

This invention relates to a method and system for controlling electric motors of a common assembly.

BACKGROUND

In certain prior art, multiple electric motors may be used to drive blades of a common assembly, such as a mower deck of a mower or a cutter. If the motors are presented with different loads, the more heavily loaded motor may perform inadequately or may reduce longevity because of thermal stress or mechanical stress. Accordingly, there is need for a method and system for controlling electric motors of a common assembly to enhance performance of one or both motors or to reduce the thermal or mechanical stress on one or both motors, for example.

SUMMARY OF THE INVENTION

In accordance with one embodiment, method or system comprises a first motor and a second motor of a common assembly (e.g., a mower deck of a mower or tractor). A first motor controller generates commanded speeds of a first rotor of a first electric motor for a first time interval and a second time interval within a series of time intervals. A first speed monitor detects observed speeds of the first rotor for the first time interval and the second time interval. Each one of the observed speeds corresponds to a respective commanded speed. A first ratio is determined based on a relationship between respective commanded speeds and corresponding observed speeds for the first time interval and the second time interval. A first data processor increments a persistence counter for the first motor if the first ratio increases or changes (e.g., if an inverted first ratio decreases) during the series of time intervals. A first motor deceleration is estimated if the persistence counter exceeds a stall limit count. A target rotor speed of a second motor is adjusted based on the estimated first motor rate of change to track the first motor rate of change (or the observed first rotor speed) if the persistence counter exceeds the stall limit count.

BRIEF DESCRIPTION OF THE DRAWINGS

FIG. 1 is a block diagram of a system for controlling electric motors of a common assembly, such as a mower deck of a mower or cutter.

FIG. 2 illustrates a bottom side of a mower deck as one possible common assembly associated with the system of controlling electric motors of FIG. 1.

FIG. 6 is a fourth embodiment of a method for controlling electric motors of a common assembly.

FIG. 8 is a sixth embodiment of a method for controlling electric motors of a common assembly.

FIG. 9 is another embodiment of a method for controlling electric motors of a common assembly.

DESCRIPTION OF THE PREFERRED EMBODIMENT

Figure 3:
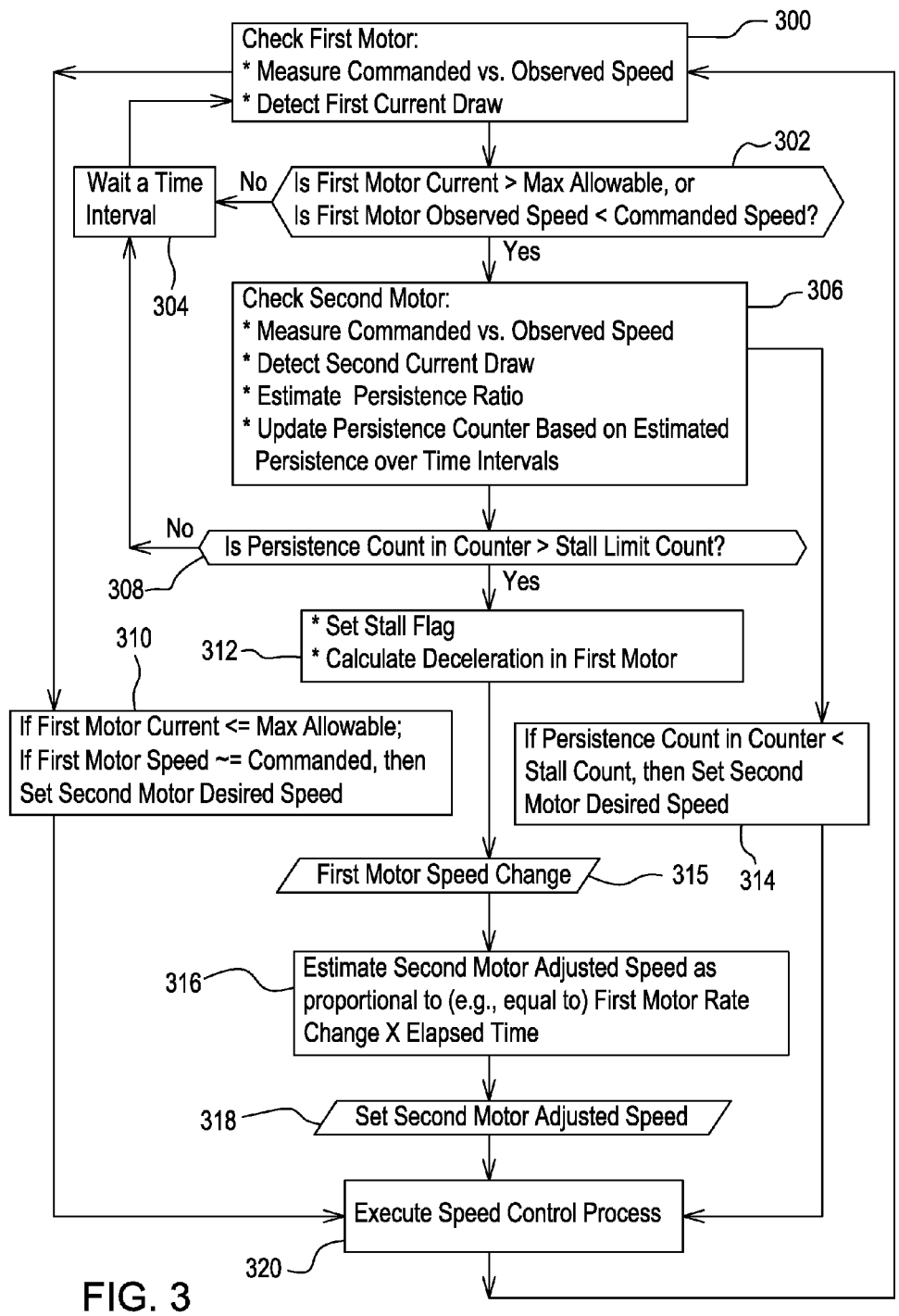
FIG. 3 is a first embodiment of a method for controlling electric motors of a common assembly.

FIG. 1 illustrates one embodiment of a system 11 for controlling a first motor 15 and a second motor 28 of a common assembly. The common assembly may generally comprise any mechanical assembly of a machine, such as a work machine, a vehicle or equipment, for mowing, cutting, milling, planing, scraping, sanding, grinding, shaping or processing material (e.g., agricultural material, seeds, vegetation, oilseeds, grains, fiber, paper, pulp, wood, lumber, wood products, metal, metal products, alloys, and alloy products). A first motor controller 14 is coupled to a corresponding first motor 15 and a second motor controller 16 is coupled to a corresponding second motor 28. As shown, the first motor controller 14 and the second motor controller 16 are coupled to a vehicle data bus 12. In turn, the vehicle data bus 12 may be coupled to an optional traction control unit 10, which is shown in dashed lines.

The first motor controller 14 and the second motor controller 16 may communicate with each other via the vehicle data bus 12. However, in an alternate embodiment the motor controllers (14, 16) may communicate with each other via a transmission line or a wireless link. The optional traction control unit 10 may control or monitor the propulsion unit, such as a traction drive motor or an internal combustion engine-electric motor hybrid that drives one or more ground-engaging wheels 44 or tracks associated with the system or vehicle.

The first motor 15 has a first shaft 22 that is attached, directly or indirectly, or coupled to the first blade 24. For example, the first shaft 22 may be attached or coupled to the first blade 24 via a clutch or a bushing that allows the shaft to rotate with respect to the first blade 24 if the first blade 24 encounters a load that exceeds a maximum load threshold (e.g., from striking a solid object, such as a rock, an elevated ground area, or a stump). As illustrated, a first magnet 20 is embedded into or secured to the first shaft 22, while the first encoder 18 or sensor is adapted to measure or detect the change in magnetic field associated with the rotation of first magnet 20 to provide an estimate of a rotational speed, rotational velocity of the first shaft 22, acceleration of the first shaft 22 or deceleration of the first shaft 22.

In an alternate embodiment, the first magnet 20 and the first encoder 18 may be replaced with another type of sensor, such as an optical sensor, a pulse encoder, a gear driven sensor, or a contact sensor.

The second motor 28 has a second shaft 34 that is attached, directly or indirectly, or coupled to the second blade 36. For example, the second shaft 34 may be attached or coupled to the second blade 36 via a clutch or a bushing that allows the shaft to rotate with respect to the second blade 36 if the second blade 36 encounters a load that exceeds a maximum load threshold (e.g., from striking a solid object, such as a rock, an elevated ground area, or a stump). As illustrated, the second magnet 32 is embedded into or secured to the second shaft 34, while the second encoder 30 or sensor is adapted to measure or detect the change in magnetic field associated with the rotation of second magnet 32 to provide an estimate of a rotational speed or rotational velocity of the second shaft 34, acceleration of the second shaft 34 or deceleration of the second shaft 34.

In an alternate embodiment, the second magnet 32 and the second encoder 30 may be replaced with another type of sensor, such as an optical sensor, a gear driven sensor, or a contact sensor.

In one embodiment, the first motor controller 14 comprises a first data processor 55 and a data storage device 59 coupled thereto a data bus 57. The first data processor 55 may comprise a microprocessor, a microcontroller, a programmable logic array, a logic circuit, an arithmetic logic unit, an application specific integrated circuit, a digital signal processor, or another data processor. The data storage device 59 comprises electronic memory, non-volatile electronic memory, random access memory, an electronically erasable programmable memory, a magnetic storage device, an optical storage device, a magnetic disc drive, an optical disc drive, or another data storage device. As illustrated in FIG. 1, the data storage device 59 stores or contains software instructions or software modules for a first speed monitor 61, a first current monitor 63, a first persistence counter 65, and a first speed control module 67.

In an alternate embodiment, one or more software modules of the data storage device 59 may be replaced with equivalent electronic modules coupled to the data bus 57.

In one embodiment, the second motor controller 16 comprises a second data processor 155 and a data storage device 59 coupled to a data bus 57. The second data processor 155 may comprise a microprocessor, a microcontroller, a programmable logic array, a logic circuit, an arithmetic logic unit, an application specific integrated circuit, a digital signal processor, or another data processor. The data storage device 59 comprises electronic memory, non-volatile electronic memory, random access memory, an electronically erasable programmable memory, a magnetic storage device, an optical storage device, a magnetic disc drive, an optical disc drive, or another data storage device. As illustrated in FIG. 1, the data storage device 59 stores or contains software instructions or software modules for a second speed monitor 161, a second current monitor 163, a second persistence counter 165, and a second speed control module 167.

In an alternate embodiment, one or more of the software modules of the data storage device may be replaced with equivalent electronic modules coupled to the data bus 51 of the second motor controller 16.

In FIG. 1, the system 11 comprises a first motor controller 14 for generating commanded speeds of a first rotor of the first electric motor for a first time interval and a second time interval. The commanded speeds may be generated by an operator via input from a user interface 51 coupled to the vehicle data bus 12. The user interface 51 may comprise a controller associated with a keypad, a foot pedal, a throttle setting, one or more switches, a user controllable variable resistor, a user controllable variable capacitor, a console, display, dial, keyboard, or touch-screen display for entering a commanded speed, a requested speed, a commanded torque or another control input for the system 11 or the motor controllers (14, 16). The first time interval and the second time interval are present within a series of time intervals. A first speed monitor 61 is adapted to detect observed speeds of the first rotor for the first time interval and the second time interval. Each one of the observed speeds corresponds to a respective commanded speed.

During a normal operational state, the first motor 15 and the second motor 28 each operate at a commanded speed or within a commanded speed and target torque range. However, in response to loading (e.g., increased loading) of its first shaft 22 or other factors (e.g., thermal stress), the first motor 15 (alone) may enter into a stall state that begins to occur when the commanded speed requested by the first controller 14, or via the user interface 51, cannot be maintained as compared to the actual or observed motor speed of the first motor 15 (e.g., provided by the first encoder or sensor 18). Similarly, the second motor 28 (alone or together with the first motor 15) may enter into a stall state that begins to occur when the commanded speed requested by the second controller 16, or via the user interface 51, cannot be maintained as compared to the actual or observed motor speed of the second motor 28 (e.g., provided by the second encoder or sensor 30). In one configuration, the first encoder 18 provides a pulsed output during motor commutation that the first speed monitor 61 uses for estimating an observed speed of the first motor 15; the second encoder 30 provides a pulsed output during motor commutation that the second speed monitor 161 uses for observed speed estimation of the second motor 28.

When the rate of change of the actual or observed motor speed versus the commanded motor speed for a particular motor (15, 28) increases persistently over a number of time intervals (e.g., set time period), the particular motor (15, 28) may enter into a stall state or is at risk or susceptible to entering into the stall state. For every time interval (e.g., task cycle of an operating system) that the rate of change increases, the persistence counter (65, 165), an internal software counter, is incremented. Each motor (15, 18) has a corresponding persistence counter (65, 165) with a persistence count. Once the persistence count of a persistence counter (65, 165) exceeds a persistence count threshold (e.g., a stall limit count), one or more controllers (14, 16) will react and prevent the stall state and to maintain the normal operational state. For example, if the first persistence counter 65 of the first motor controller 14 exceeds a persistence count threshold, the first motor controller 14 communicates with the second motor controller 16 via the vehicle data bus 12 (or a communications line, transmission line, or wireless link) to adjust the speed or velocity of the second motor 28 in proportion to the observed speed of the first motor 15, or as otherwise disclosed in this document.

In one exemplary configuration, the first persistence counter 65 determines a difference between the respective commanded speeds and the corresponding observed speeds for the first time interval and the second time interval. For example, the first persistence counter 65 increments the persistence counter for the first motor 15 if the difference increases during the series of time intervals. The first speed control module 67 estimates a first motor rate of change (e.g., first motor deceleration) in first rotor speed of the first motor 15 if the persistence counter exceeds a stall limit count. A second motor controller 16 adjusts a target rotor speed of the second motor 28 based on or to track the estimated first motor rate of change (e.g., first motor deceleration) to pursue the target rotor speed proportional to or equal to the first rotor speed if the persistence counter exceeds the stall limit count.

Although the second motor controller 16 adjusts the target rotor speed of the second motor 28 based on the status of the first persistence counter 65 of the first motor controller 14 in the above exemplary configuration, in alternate configurations (e.g., consistent with the common assembly) the first motor controller 14 may adjust the target rotor speed of the first motor 15 in response to the second persistence counter 165 exceeding the stall limit count. Further, as illustrated in FIG. 1, the motor controllers (14,16) support adjustment of the target rotor speed of the first motor 15, the second motor 28, or both to prevent a stall state in response to one or more persistence counters (65, 165) exceeding a threshold persistence count or stall limit.

Returning to the exemplary configuration, the second motor controller 16 may adjust the target rotor speed of the second motor 28 in accordance with various examples, which may be applied individually or collectively. Under a first example, the second motor controller 16 further comprises a second speed control module 167 for decreasing the target rotor speed and corresponding motor input current (e.g., to one or more windings or phases) of the second motor 28 to a fixed rotor speed (x) subject to a corresponding motor input current limit (y) (e.g., applicable to one or more windings or phases), wherein the target rotor speed is proportional to or equal to the observed first motor speed and wherein the motor input current is less than or equal to the current limit.

Under a second example, the second motor controller 16 further comprises a second speed control module 167 for decreasing the target rotor speed and corresponding motor input current (e.g., to one or more windings or phases) of the second motor 28 to a fixed rotor speed (x) for a time period subject to a corresponding motor input current limit (y) (e.g., applicable to one or more windings or phases), where one or more of the following is satisfied: (1) the target rotor speed is proportional to or equal to the observed first motor speed; (2) the motor input current is less than or equal to the current limit; or (3) x and y are consistent with a linear equation or quadratic equation for a normal operational range for the second motor 28 and the target rotor speed is proportional to or equal to the observed first motor speed.

For the second example and more generally applicable to any embodiment disclosed in this document, the normal operational range means that the target rotor speed falls within a suitable operational speed range for a corresponding torque range (or current range of one or more phases of the motor) that is matched to the given load or required for the given load on the motor (15, 28). The linear equation or quadratic equation may represent a characterization or performance curve of a particular motor (15, 28), or may represent an upper boundary or lower boundary for the normal operational range of the motor (15, 28). In one embodiment, the controller (14, 16) selects an operating point within the normal operational range consistent with user input or commanded speed from an operator via a user interface 51. The data storage device (59) may store one or more of the following items: (1) linear equation or quadratic equation representative of the performance curve of a particular motor in terms of target rotor speed and corresponding input current (e.g., maximum input current for a given target rotor speed to one or more phases of the motor windings), or target rotor speed versus torque, (2) an upper boundary or lower boundary of a normal operational range of a motor, (3) any performance curve or normal operational range of a particular motor to avoid application of excessive current or electrical energy to motor input or motor windings, (4) a look-up table or relational database of target rotor speed (x) versus current limit (y) or an operational current range for a particular motor, and (5) a stall limit count or threshold persistence count for a corresponding motor.

Under a third example, the second motor 28 controller 16 further comprises a second speed control module 167 for decreasing the target rotor speed of the second motor 28 to be proportional to the first motor deceleration multiplied by an elapsed time, between the first time interval and the second time interval, plus a previous second rotor speed of the second motor 28.

Under a fourth example, the target rotor speed of the second motor 28 is decreased in accordance with the following equation:

$$\omega = \omega_0 + \alpha t,$$

where $\alpha$ is the constant negative angular acceleration equal to the first motor 15 deceleration, $\omega$ is the target angular velocity of the second motor 28, and $\omega_0$ is previous second rotor speed, and t is elapsed time between the first time interval and the second time interval.

Under a fifth example, the target rotor speed of the second motor 28 is modeled as a time integral to address time-varying angular acceleration in accordance with the following equation:

$$\omega(t) = \omega_0 + \int_0^T \alpha(t) dt,$$

where $\omega(t)$ is the target angular velocity of the second motor 28 for a time within time period T, $\omega_0$ is an initial second rotor speed at T=0, $\alpha(t)$ is the negative angular acceleration or deceleration that is a function of time, and is equal to the absolute value of the first motor 15 deceleration at a corresponding time.

In one embodiment, the first motor 15 and the second motor 28 each comprise a brushless direct current (BLDC) motor, which facilitates high torque in a small package. A BLDC motor may comprise an integral inverter that drives a multi-phase alternating current motor portion, for example. However, in other embodiments that fall within the scope of the appended claims, the first motor 15 and the second motor 28 may comprise any direct current motor, alternating current motor, a multiple phase alternating current motor, an electronically commutated motor, a switched reluctance motor, an induction motor, synchronous motor, permanent magnet motor, or other type of electric motor.

FIG. 2 shows an illustrative example where the common assembly comprises the mower deck 40 of a mower with dual cutting blades (24, 36). Like reference numbers in FIG. 1 and FIG. 2 indicate like elements. For illustrative purposes, FIG. 2 shows a bottom side of the mower deck 40 where the blades (24, 36) are exposed.

In FIG. 2, the first motor 15 and the second motor 28 are attached to a mower deck 40 via one or more fasteners. For example, the first motor 15 and the second motor 28 may be mounted to a top side of the mower deck 40 via fasteners or mounting brackets that mate with corresponding holes in the mower deck 40. The first motor 16 and the second motor 28 of FIG. 2 are coupled to the first motor controller 14 and the second motor controller 16 of FIG. 1.

The first motor 15 is capable of rotating a first blade 24. The second motor 28 is capable of rotating a second blade 36. As illustrated in FIG. 2, the first blade 24 is located proximate to a discharge chute 42 of the mower deck 40, whereas the second blade 36 is located furthest away from the discharge chute 42. Both the first blade 24 and the second blade 36 rotate in the same rotational direction 46. Although the blades illustrate in the clockwise direction as shown by the curved arrows in FIG. 2, in alternative configurations that blades may rotate in the counter-clockwise direction. The mower deck 40 may be supported by one or wheels 44 mounted to a periphery of the mower deck 40.

Referring to FIG. 1 and FIG. 2, collectively, a first current monitor 63 is adapted to detect a first current draw of the first motor 15, where the first motor 15 is subject to a variable load from cut material presented by both the first mower blade and the second mower blade. A current sensor in the first motor 15 may provide current data or current sampling for processing by the first current monitor 63, where such current samples may pertain to one or more phases or windings of the first motor 15. The first data processor 55 determines whether the first current draw is greater than a maximum allowable current draw. A second data processor of the second motor controller 16 is adapted to determine a second current draw of a second motor 28 and a commanded versus observed speed of the second motor 28 if the first current draw is greater than the maximum allowable current draw. A current sensor in the second motor 28 may provide current data or current samples for processing by the second current monitor 163, where such current samples may pertain to one or more phases or windings of the second motor 28.

As configured in FIG. 2, during operating of the mower deck 40 the first motor 15 may experience a greater load than the second motor 28 because the first blade 24 of the first motor 15 receives the load of cut vegetation (e.g., grass and weeds) from both the first blade 24 and the second blade 36 to discharge the cut vegetation the discharge chute 42. Accordingly, the first motor 15 is susceptible to an unwanted stall condition (e.g., by the persistent count threshold being exceeded), which can be reduced or prevented by cooperative control of both the first motor 15 and the second motor 28 by the motor controllers (14, 16). For example, if the first persistence counter 65 indicates that the first motor 15 is approaching a stall condition, the second motor velocity of the second motor 28 can be reduced proportional to the first motor velocity, or as otherwise disclosed in this document, to mitigate the possibility of a stall state and to reduce the load (transmitted by the first blade 24) from the vegetation material (e.g., grass and weeds) on the first motor 15.

FIG. 3 is a flow chart of a first embodiment of a method for controlling motors. The method of FIG. 3 begins in step 300.

In step 300, a first motor controller 14 or first data processor 55 checks a first operational status of the first motor 15. The first operational status may comprise an indicator of commanded speed versus observed speed (of the first motor 15) and an first current draw (of the first motor 15). For example, the first speed monitor 61 of the first motor controller 14 may measure commanded versus observed speed and the first current monitor 63 may estimate a first current draw of the first motor 15 during a time interval. The first operational status may indicate whether or not the first motor 15 is operating within a normal operational range.

In step 302, the first motor controller 14 or first current monitor 63 determines if the first motor current or first current draw is greater than a maximum allowable current; or the first motor controller 14, the first speed control module 67, or first speed monitor 61 determines whether a first motor observed speed is less than the commanded speed. If the first motor current is greater than the maximum allowable current or if first motor observed speed is less than the commanded speed, then the method continues with step 306. However, if the first motor current is not greater than the maximum allowable current or if the first motor observed speed is not less than the commanded speed, then the method continues with block 304 where the system 11 or the data processors (55, 155) wait a time interval.

In step 306, the second motor controller 16 or second data processor 155 checks a second operational status of the second motor 28. The second operational status may comprise an indicator of commanded speed versus observed speed and a second current draw. For example, the second speed monitor 161 of the second motor controller 16 may measure commanded versus observed speed and the second current monitor 163 may detect a second current draw of the second motor 28 during a time interval. The second operational status may indicate whether or not the second motor 28 is operating within a normal operational range. The second data processor 155 is adapted to estimate persistence ratio based on a count of time intervals in which the first motor observed speed or the second observed motor speed is less than a commanded speed. For example, the first persistence counter 65, the second persistence counter 165, or both are updated based on estimated persistence over time intervals.

In block 308, the first data processor 55, the second data processor 155, or both determine whether a persistence count in the persistence counter (65, 165) is greater than a stall limit count. If the persistence count in the persistence counter is greater than the stall limit count or persistence count threshold, the method continues with step 312. However, if the persistence count in the persistence counter is not greater than the stall limit count (or persistence count threshold), the method continues in step 304.

In block 312, the first data processor 55, the second data processor 155, or both set a stall flag and calculate deceleration in the first motor 15. The first motor controller 14 estimates a first motor speed change of the first motor 15, consistent with the calculated deceleration and transmits the first motor speed, speed change or deceleration to the second motor controller 16 via the vehicle data bus 12 or otherwise.

In block 316 at the second mode controller 16, the second motor controller 16 estimates a second motor adjusted speed as proportional to (e.g., equal to) a first motor 15 rate change multiplied by elapsed time. In an alternate configuration, the second motor controller 16 estimates a second motor adjusted speed to track a first motor deceleration (e.g., scaled or indexed thereto), a first motor speed (e.g., proportional, scaled or indexed thereto), or both.

In block 318, the second motor controller 16 or second speed control module 167 sets a second motor adjusted speed of the second motor 28.

In block 320, the second motor controller 16 executes a speed control process to maintain or reach a target speed of the second motor 28, which is executed where any of the following three conditions is satisfied: (1) if the persistence count in the counter (e.g., first persistence counter 65) is less than the stall count limit or the persistent count threshold in block 314, (2) if the first motor 15 current is less than or equal to maximum allowable first motor current and if the first motor 15 speed is approximate equal to the commanded speed (e.g., in block 310), and (3) after execution of block 316. The second motor adjusted speed, which is sent from the second motor controller 16 to the second motor 28, is represented by trapezoidal block 318. The user may establish the target speed of the second motor via the user interface 51, where the established target speed may or may not be constrained by the deceleration of the first motor 15 and the first motor speed.

Figure 4:
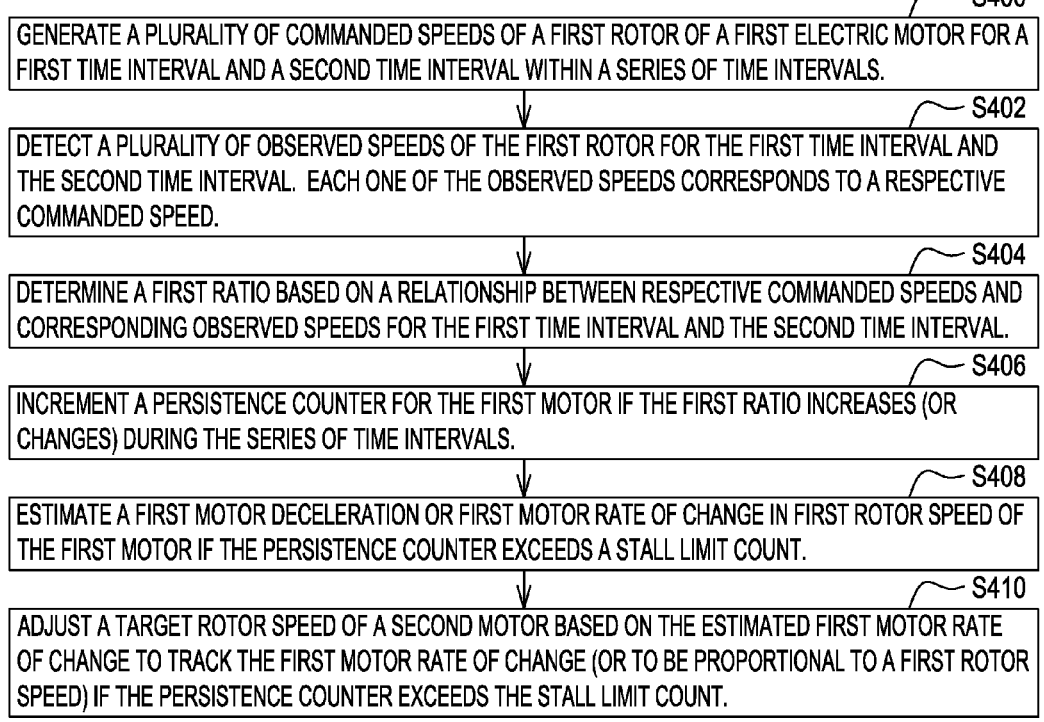
FIG. 4 is a second embodiment of a method for controlling electric motors of a common assembly.

FIG. 4 is a flow chart of a first embodiment of a method for controlling motors in accordance with the disclosure. The method of FIG. 4 begins in step 400.

In step S400, a first motor controller 14 generates a plurality of commanded speeds of a first rotor of a first electric motor 15 for a first time interval and a second time interval within a series of time intervals.

In step S402, a first speed control module 67 detects a plurality of observed speeds of the first rotor or first shaft 22 for the first time interval and the second time interval. Each one of the observed speeds corresponds to a respective commanded speed.

In step S404, a first data processor 55 or first motor controller 14 determines a first ratio based on a relationship between respective commanded speeds and corresponding observed speeds for the first time interval and the second time interval. For example, a first data processor 55 or first motor controller 14 determines a common denominator for the respective commanded speeds and a numerator difference between the corresponding observed speeds for the first time interval and the second time interval. A first ratio is formed by the numerator difference and the common denominator for the first motor 15.

In an alternative embodiment, an inverted first ratio is formed by inverting the first ratio.

In step S406, a first data processor 55 or first motor controller 14 increments a first persistence counter 65 for the first motor 15 if the first ratio increases or changes during the series of time intervals. Alternately, a first data processor 55 or first motor controller 14 increments a count of the first persistence counter 65 if the inverted first ratio decreases during the series of time intervals.

In step S408, the first data processor 55, the first speed monitor 61, or the first speed control module 67 estimates a first motor deceleration or first motor rate of change in first rotor speed or first shaft 22 of the first motor 15 if the count of the first persistence counter 65 exceeds a stall limit count, or a persistence count threshold. The first persistence counter 65 for the first motor 15 exceeds a stall limit value, or persistence count threshold, is indicative of the first motor 15 approaching or being at a stall mode. Further, in step S408, the first motor 15 controller 14 may communicate the first motor deceleration or first motor rate of change to the second motor 28 controller 16 via the vehicle data bus 12, or otherwise.

In step S410, the second motor controller 16, second data processor 155, or second speed control module 167 adjusts a target rotor speed of a second motor 28 based on the estimated first motor rate of change to track the first motor rate of change, or the first rotor speed, if the count value in first persistence counter 65 exceeds the stall limit count or persistence count threshold. The second motor controller 16, the second data processor 155 or the second speed control module 167 may adjust the target rotor speed of the second motor 28 in accordance with various examples, which may be applied individually or collectively.

Under a first example, the second motor controller 16 further comprises a second speed control module 167 for decreasing the target rotor speed and corresponding motor input current (e.g., to one or more windings or phases) of the second motor 28 to a fixed rotor speed (x) subject to a corresponding motor input current limit (y) (e.g., applicable to one or more windings or phases), wherein the target rotor speed is proportional to (e.g., indexed to or scaled relative to) or equal to the observed first motor speed and wherein the motor input current is less than or equal to the current limit.

Under a second example, the second motor controller 16 further comprises a second speed control module 167 for decreasing the target rotor speed and corresponding motor input current (e.g., to one or more windings or phases) of the second motor 28 to a fixed rotor speed (x) for a time period subject to a corresponding motor input current limit (y) (e.g., applicable to one or more windings or phases), where one or more of the following is satisfied: (1) the target rotor speed is proportional to or equal to the observed first motor speed; (2) the motor input current is less than or equal to the current limit; or (3) x and y are consistent with a linear equation or quadratic equation for a normal operational range for the second motor 28 and the target rotor speed is proportional to or equal to the observed first motor speed.

The normal operational range means that the target rotor speed falls within a suitable operational speed range for a corresponding torque range (or current range of one or more phases of the motor) that is matched to the given load or required for the given load on the motor (15, 28). The linear equation or quadratic equation may represent a characterization or performance curve of a particular motor (15, 28), or may represent an upper boundary or lower boundary for the normal operational range of the motor (15, 28). The data storage device (59) may store one or more of the following items: (1) linear equation or quadratic equation representative of the performance curve of a particular motor in terms of target rotor speed and corresponding input current (e.g., maximum input current for a given target rotor speed to one or more phases of the motor windings), or target rotor speed versus torque, (2) an upper boundary or lower boundary of a normal operational range of a motor, (3) any performance curve or normal operational range of a particular motor to avoid application of excessive current or electrical energy to motor input or motor windings, (4) a look-up table, relational database, or data structure of target rotor speed (x) versus current limit (y) or an operational current range for a particular motor, and (5) a stall limit count or threshold persistence count for a corresponding motor.

Under a third example, the second motor 28 controller 16 further comprises a second speed control module 167 for decreasing the target rotor speed of the second motor 28 to be proportional to the first motor deceleration multiplied by an elapsed time, between the first time interval and the second time interval, plus a previous second rotor speed of the second motor 28.

Under a fourth example, the target rotor speed of the second motor 28 is decreased in accordance with the following equation:

$$\omega = \omega_0 + \alpha t,$$

where $\alpha$ is the constant negative angular acceleration equal to the first motor 15 deceleration, $\omega$ is the target angular velocity of the second motor 28, and $\omega_0$ is previous second rotor speed, and t is elapsed time between the first time interval and the second time interval.

Under a fifth example, the target rotor speed of the second motor 28 is modeled as a time integral to address time-varying angular acceleration in accordance with the following equation:

$$\omega(t) = \omega_0 + \omega_0 \int^T \alpha(t) dt,$$

where $\omega(t)$ is the target angular velocity of the second motor 28 for a time within time period T, $\omega_0$ is an initial second rotor speed at T=0, $\alpha(t)$ is the negative angular acceleration or deceleration that is a function of time, and is equal to the absolute value of the first motor 15 deceleration at a corresponding time.

Figure 5:
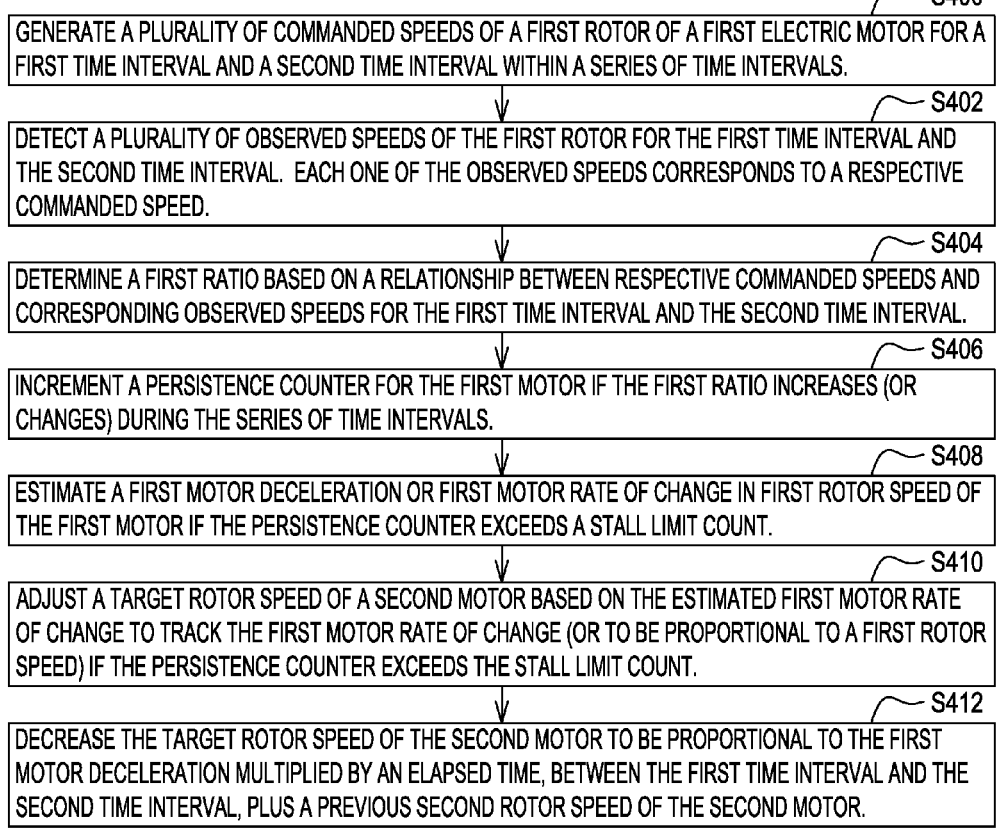
FIG. 5 is a third embodiment of a method for controlling electric motors of a common assembly.

The method of FIG. 5 is similar to the method of FIG. 4, except the method of FIG. 5 further comprises step S412. Like reference numbers in FIG. 4 and FIG. 5 indicate like steps or procedures.

Step S412 may be executed simultaneously with or after step S410. However, step S412 is only executed if the count in value in the persistence counter (e.g., first persistence counter 65) exceeds the stall limit count in step S410. Otherwise, the method of FIG. 5 terminates with step S410.

In step S412, the second data processor 155, second motor controller 16, or second speed control module 167 decreases the target rotor speed of the second motor 28 to be proportional to the first motor deceleration multiplied by an elapsed time, between the first time interval and the second time interval, plus a previous second rotor speed of the second motor 28.

The method of FIG. 6 is similar to the method of FIG. 4, except the method of FIG. 6 further comprises step S414. Like reference numbers in FIG. 4 and FIG. 6 indicate like steps or procedures.

Step S414 may be executed simultaneously with or after step S414. However, step S414 is only executed if the count value of the persistence counter (e.g., first persistence counter 65) exceeds the stall limit count or persistence count threshold in step S410.

In step S414, the second data processor 155, second motor controller 16, or second speed control module 167 decreases the target rotor speed of the second motor 28 in accordance with the following equation:

$$\omega=\omega_0+\alpha t,$$

where $\alpha$ is the constant negative angular acceleration equal to the first motor 15 deceleration, $\omega$ is the target angular velocity of the second motor 28, and $\omega_0$ is previous second rotor speed, and t is elapsed time between the first time interval and the second time interval.

Figure 7:
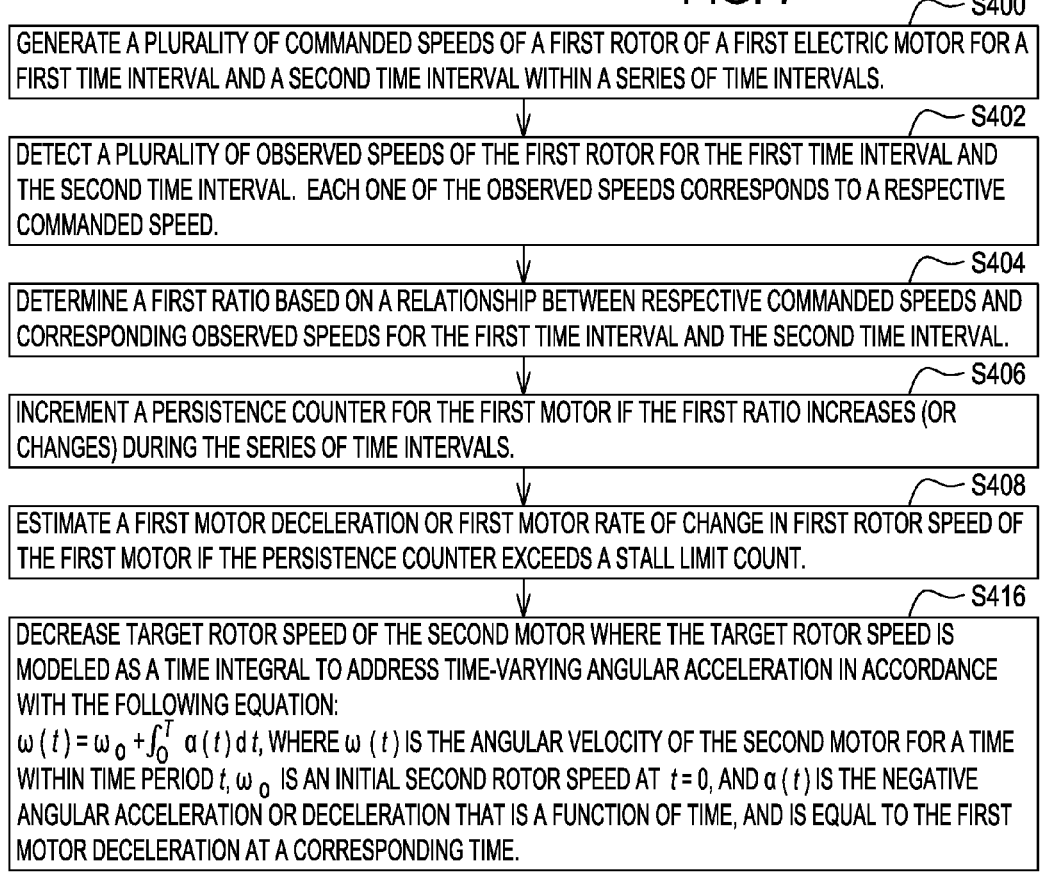
FIG. 7 is a fifth embodiment of a method for controlling electric motors of a common assembly.

The method of FIG. 7 is similar to the method of FIG. 4, except the method of FIG. 7 replaces step S410 with S416. Like reference numbers in FIG. 4 and FIG. 7 indicate like steps or procedures.

In step S416, the second data processor 155, second motor 28 controller 16, or second speed control module 167 decreases the target rotor speed of the second motor 28 in accordance with the following equation, wherein the target rotor speed of the second motor 28 is modeled as a time integral to address time-varying angular acceleration:

$$\omega(t)=\omega_0 \int_0^T \alpha(t)dt,$$

where $\omega(t)$ is the target angular velocity of the second motor 28 for a time within time period T, $\omega_0$ is an initial second rotor speed at T=0, $\alpha(t)$ is the negative angular acceleration or deceleration that is a function of time, and is equal to the absolute value of the first motor 15 deceleration at a corresponding time.

The method of FIG. 8 is similar to the method of FIG. 4, except the method of FIG. 8 replaces step S404 with S420. Like reference numbers in FIG. 4 and FIG. 7 indicate like steps or procedures.

In step S420, a first data processor 55, a second processor 155, or both determine the common denominator for the respective commanded speeds and a numerator difference between the corresponding observed speeds if a first current draw of the first motor 15 is greater than a maximum allowable current draw, if a second current draw of the second motor 28 is greater than a maximum allowable current draw, and if an observed speed is less than a commanded speed of the first motor 15 for the first time interval and the second time interval. In step S420, a first ratio is formed by the numerator difference and the common denominator for the first motor 15. For example, the first motor controller 14 or the first data processor 55 forms the first ratio by the numerator difference and the common denominator for the first motor 15. Alternately, the first motor controller 14 or the first data processor 55 forms an inverted first ratio by inverting the first ratio, or otherwise calculating the first ratio.

Step S420 may be executed in accordance with various techniques, which may be applied individually or cumulatively. Under a first technique, the first speed monitor 61 determines an observed rotor speed of the first rotor or first shaft 22 of the first motor 15 and a second speed monitor 161 determines an observed speed of the second motor 28 or second shaft 34. The first data processor 55, the second data processor 155, or both determine the common denominator for the respective commanded speeds and a numerator difference between the corresponding observed speeds. A first current monitor 63 is capable of determining a first current draw of the first motor 15, where a first current sensor is associated with (e.g., inductively coupled to) one or more input phases, at least one motor windings, or one or more inputs to the first motor 15. A second current monitor 163 is capable of detecting a second current draw of a second motor 28, where a first current sensor is associated with (e.g., inductively coupled to) one or more input phases, at least one motor windings, or one or more inputs to the first motor 15, where a second current sensor is associated with (e.g., inductively coupled to) one or more input phases, at least one motor windings, or one or more inputs to the second motor 28. The first data processor 55 determines whether or not a first current draw of the first motor 15 is greater than a maximum allowable current draw. The second data processor determines whether or not a second current draw of the second motor 28 is greater than maximum allowable current draw. A second motor controller 16 or second speed monitor 161 determines an observed speed of the second motor 28 versus a commanded speed of the second motor 28 if one or more of the following conditions exist during the evaluated time interval or intervals: (1) if the first current draw of the first motor 15 is greater than the maximum allowable current draw and (2) if the first observed rotor speed is less than a commanded rotor speed for a group of time intervals (e.g., first time interval and second time interval).

Under a second technique for carrying out step S420, the second data processor 155 of the second motor controller 16 is adapted to determine the common denominator for the respective commanded speeds and a numerator difference between the corresponding observed speeds if a first current draw of the first motor 15 is greater than a maximum allowable current draw, if a second current draw of the second motor 28 is greater than a maximum allowable current draw, and if an observed speed is less than a commanded speed of the first motor 15 for the first time interval and the second time interval. In one embodiment, a first current monitor 63 is adapted to determine a first current draw of the first motor 15 (e.g., from a current sensor associated with the first motor input terminals). If the first motor 15 and the second motor 28 comprise components within a common assembly for cutting material (e.g., vegetation), the first motor 15 can be subject to variable load, depending upon the configuration or design of the common assembly, such as the first motor 15 driving a first blade 24 proximate to or nearer a discharge chute 42 of a mower deck 40 than a second motor 28 driving a second blade 36 spaced apart from the discharge chute 42. If the first motor 15 is subject to a variable load, the first current monitor 63 is adapted to determine whether the first current draw is greater than a maximum allowable current draw. A second current monitor 163 is adapted to determine a second current draw of a second motor 28 and an observed speed versus a commanded speed of at least one of the first motor 15 and the second motor 28 if the first current draw is greater than the maximum allowable current draw.

The method of FIG. 9 is similar to the method of FIG. 4, except the method of FIG. 9 further comprises steps S422, S424, S426, S428, S430 and S432. Like reference numbers in FIG. 4 and FIG. 9 indicate like steps or procedures.

In step S422, the second motor controller 16 or second data processor 155 generates a plurality of commanded speeds of a second rotor of a second motor 28 for a third time interval and a fourth time interval within a series of time intervals.

In step S424, the second speed monitor 161 or the second motor controller 16 detects a plurality of observed speeds of the second rotor for the third time interval and the fourth time interval; each one of the observed speeds corresponds to a respective commanded speed.

In step S426, the second motor controller 16 or second data processor 155 determines a common denominator for the respective commanded speeds and a secondary numerator difference between the corresponding observed speeds for the third time interval and the fourth time interval. A second ratio is formed by the secondary numerator difference and the common denominator for the second motor 28. Alternately, an inverted second ratio is formed by inverting the second ratio or another calculation.

In step S428, the second motor controller 16 or the second data processor 155 increments a secondary persistence counter 165 for the second motor 28 if the second ratio increases (or changes) during the series of time intervals. Alternately, the second data processor 155 or controller increments the secondary persistence counter 165 if the inverted second ratio decreases during the series of time intervals.

In step S430, the second motor controller 16 or the second data processor 155 estimates a second motor 28 deceleration or second motor rate of change in second rotor speed of the second motor 28 if the count of the second persistence counter 165 exceeds a stall limit count or persistence count threshold. If the count of the second persistence counter 165 (for the second motor 28) exceeds a stall limit value, the excessive count is indicative of the second motor 28 approaching or being at a stall mode. Further, the second motor controller 16 communicates the second motor deceleration or the second motor rate of change to the first motor controller 14 (e.g., via the vehicle data bus 12).

In step S432, the first motor controller 14 adjusts (e.g., decelerates) a target rotor speed of a first motor 15 based on the estimated second motor rate of change to track or match the observed rotor speed of the second motor 28.

The method and system is well-suited for reducing the thermal and mechanical stress on a motor of a dual motor assembly, where one motor experiences different loading than another motor. For example, the system and method reduces the rotational speed of the less loaded motor to track the rotational speed of the more heavily loaded motor to reduce the load on the more heavily loaded motor during a recovery time period. By monitoring the current flowing into a particular motor and the motor controller commanded speed versus actual or observed speed, at any given instant in time the method and system monitors the conditions being experienced by the particular motor connected to a corresponding blade or shaft. At the point in time where the particular motor approaches a stall state or begins to stall, one or more motor controllers rapidly control or tune the motors to clear or prevent the stall condition.

If applied to a mower deck, the method and system is well suited for replacing belt driven pulleys (with their shafts attached to mower blades) with electric motors (with their shafts) operably connected to the mower blades without any degradation in performance for mowing dense vegetation or tall grass.

Having described the preferred embodiment, it will become apparent that various modifications can be made without departing from the scope of the invention as defined in the accompanying claims.

The following is claimed:

1. A method for controlling a first motor and a second motor of a common assembly, the method comprising:
    generating a plurality of commanded speeds of a first rotor of a first electric motor for a first time interval and a second time interval within a series of time intervals;
    detecting a plurality of observed speeds of the first rotor for the first time interval and the second time interval, each one of the observed speeds corresponding to a respective commanded speed;
    determining a first ratio based on a relationship between respective commanded speeds and corresponding observed speeds for the first time interval and the second time interval;
    incrementing a persistence counter for the first motor if the first ratio decreases or changes during the series of time intervals;
    estimating a first motor deceleration or first motor rate of change in first rotor speed of the first motor if the persistence counter exceeds a stall limit count; and
    adjusting a target rotor speed of a second motor based on the estimated first motor rate of change to track the first motor rate of change or the first rotor speed if the persistence counter exceeds the stall limit count, wherein the adjusting further comprises decreasing the target rotor speed and current of the second motor to be proportional to the first motor deceleration multiplied by an elapsed time, between the first time interval and the second time interval, plus a previous second rotor speed of the second motor.

2. The method according to claim 1 wherein the incrementing the persistence counter for the first motor further comprises incrementing the persistence counter for the first motor if an inversion of the first ratio increases during the series of time intervals.

3. The method according to claim 1 wherein the adjusting further comprises:
    decreasing the target rotor speed to a fixed rotor speed at a respective motor input current subject to a corresponding current limit, wherein the target rotor speed is proportional to or equal to the observed first motor speed and wherein the motor input current is less than or equal to the current limit.

4. The method according to claim 1 wherein the adjusting further comprises:
    decreasing the target rotor speed of the second motor in accordance with the following equation:

$$\omega = \omega_0 + \alpha t,$$

where $\alpha$ is the constant negative angular acceleration or deceleration of the first motor deceleration, $\omega$ is the target angular velocity of the second motor, and $\omega_0$ is previous second rotor speed, and t is elapsed time between the first time interval and the second time interval.

5. The method according to claim 1 wherein the target rotor speed of the second motor is modeled as a time integral to address time-varying angular acceleration in accordance with the following equation:

$$\omega(t) = \omega_0 + \int_0^T \alpha(t) dt,$$

where $\omega(t)$ is the target angular velocity of the second motor for a time within time period T, $\omega_0$ is an initial second rotor speed at T=0, $\alpha(t)$ is the negative angular acceleration or deceleration that is a function of time, and is equal to the first motor deceleration at a corresponding time.

6. The method according to claim 1 wherein determining a first ratio based on a relationship between respective fractional representations of commanded speeds and corresponding observed speeds further comprises:
    determining a common denominator for the respective commanded speeds and a numerator difference between the corresponding observed speeds for the first time interval and the second time interval, a first ratio formed by the numerator difference and the common denominator for the first motor.

7. The method according to claim 1 further comprising:
detecting a first current draw of the first motor, where the first motor is subject to variable load and wherein the first motor and the second motor comprise components within a common assembly for cutting material;
determining whether the first current draw is greater than a maximum allowable current draw;
detecting a second current draw of a second motor and an observed speed versus a commanded speed of at least one of the first motor and the second motor if the first current draw is greater than the maximum allowable current draw.

8. The method according to claim 1 further comprising:
detecting a first current draw of the first motor, where the first motor is subject to a variable load and wherein the first motor and the second motor comprise components within a common assembly for cutting material;
determining whether the first current draw is greater than a maximum allowable current draw;
detecting an observed rotor speed of the first rotor of the first motor;
detecting a second current draw of a second motor and an observed speed of the second motor versus a commanded speed of the second motor if the first current draw is greater than the maximum allowable current draw and if the first observed rotor speed is less than a commanded rotor speed for a group of time intervals.

9. The method according to claim 1 wherein the persistence counter for the first motor exceeding a stall limit value is indicative of the first motor approaching or being at a stall mode.

10. The method according to claim 6 wherein:
determining the common denominator for the respective commanded speeds and a numerator difference between the corresponding observed speeds if a first current draw of the first motor is greater than a maximum allowable current draw, if a second current draw of the second motor is greater than a maximum allowable current draw, and if an observed speed is less than a commanded speed of the first motor for the first time interval and the second time interval.

11. The method according to claim 6 further comprising:
generating a plurality of commanded speeds of a second rotor of a second electric motor for a third time interval and a fourth time interval within a series of time intervals;
detecting a plurality of observed speeds of the second rotor for the third time interval and the fourth time interval, each one of the observed speeds corresponding to a respective commanded speed;
determining a common denominator for the fractional representations of the respective commanded speeds and a secondary numerator difference between the corresponding observed speeds for the third time interval and the fourth time interval, a second ratio formed by the secondary numerator difference and the common denominator for the first motor;
incrementing a secondary persistence counter for the second motor if the second ratio increases or changes during the series of time intervals;
estimating a second motor deceleration or second motor rate of change in second rotor speed of the second motor if the second ratio exceeds a stall limit count; and
adjusting or decelerating a target rotor speed of a first motor based on the estimated second motor rate of change to track or match the observed rotor speed of the second motor.

12. A system for controlling a first motor and a second motor of a common assembly, the system comprising:
a first motor;
a second motor;
a first motor controller for generating a plurality of commanded speeds of a first rotor of the first electric motor for a first time interval and a second time interval within a series of time intervals;
a first speed monitor for detecting a plurality of observed speeds of the first rotor for the first time interval and the second time interval, each one of the observed speeds corresponding to a respective commanded speed;
a first persistence counter for determining a difference between the respective commanded speeds and the corresponding observed speeds for the first time interval and the second time interval, incrementing the persistence counter for the first motor if the difference increases during the series of time intervals;
a first speed control module for estimating a first motor rate of change in first rotor speed of the first motor if the persistence counter exceeds a stall limit count; and
a second motor controller for adjusting a target rotor speed of the second motor based on or to track the estimated first motor rate of change if the persistence counter exceeds the stall limit count; wherein the second motor controller further comprises a second speed control module for decreasing the target rotor speed of the second motor to be proportional to the first motor deceleration multiplied by an elapsed time, between the first time interval and the second time interval, plus a previous second rotor speed of the second motor.

13. The system according to claim 12 wherein the second motor controller further comprises a second speed control module for decreasing the target rotor speed to a fixed rotor speed at a respective motor input current subject to a corresponding current limit, wherein the target rotor speed is proportional to or equal to the observed first motor speed and wherein the motor input current is less than or equal to the current limit.

14. The system according to claim 12 wherein the target rotor speed of the second motor is decreased in accordance with the following equation:

$$\omega = \omega_0 + \alpha t,$$

where $\alpha$ is the constant negative angular acceleration equal to the first motor deceleration, w is the target angular velocity of the second motor, and $\omega_0$ is previous second rotor speed, and t is elapsed time between the first time interval and the second time interval.

15. The system according to claim 12 wherein the target rotor speed of the second motor is modeled as a time integral to address time-varying angular acceleration in accordance with the following equation:

$$\omega(t) = \omega_0 + \int_0^T \alpha(t) dt,$$

where $\omega(t)$ is the target angular velocity of the second motor for a time within time period T, $\omega_0$ is an initial second rotor speed at T=0, $\alpha(t)$ is the negative angular acceleration or deceleration that is a function of time, and is equal to the absolute value of the first motor deceleration at a corresponding time.

16. The system according to claim 12 further comprising:
the first motor and the second motor attached to a mower deck for rotating a first mower blade and a second mower blade, respectively, the first mower blade located proximate to a discharge chute of the mower deck;
a first current monitor for detecting a first current draw of the first motor, where the first motor is subject to a variable load from cut material presented by both the first mower blade and the second mower blade;
a first data processor for determining whether the first current draw is greater than a maximum allowable current draw;
a second data processor of the second motor controller for sampling a second current draw of a second motor and an commanded versus observed speed of the second motor if the first current draw is greater than the maximum allowable current draw.

17. The system according to claim 12 further comprising:
a first current monitor for detecting a first current draw of the first motor, where the first motor is subject to variable load and wherein the first motor and the second motor comprise components within a common assembly for cutting material, the first current monitor adapted to determine whether the first current draw is greater than a maximum allowable current draw;
a second current monitor for detecting a second current draw of a second motor and an observed speed versus a commanded speed of at least one of the first motor and the second motor if the first current draw is greater than the maximum allowable current draw.

18. The system according to claim 12 further comprising:
a first current monitor for detecting a first current draw of the first motor, where the first motor is subject to a variable load and wherein the first motor and the second motor comprise components within a common assembly for cutting material, the first current monitor adapted to determine whether the first current draw is greater than a maximum allowable current draw;
the first speed monitor for determining an observed rotor speed of the first rotor of the first motor;
a second current monitor for detecting a second current draw of a second motor and an observed speed of the second motor versus a commanded speed of the second motor if the first current draw is greater than the maximum allowable current draw and if the first observed rotor speed is less than a commanded rotor speed for a group of time intervals.

19. The system according to claim 12 further comprising:
a second motor controller for generating a plurality of commanded speeds of a second rotor of a second electric motor for a third time interval and a fourth time interval within a series of time intervals;
a second speed monitor for detecting a plurality of observed speeds of the second rotor for the third time interval and the fourth time interval, each one of the observed speeds corresponding to a respective commanded speed;
the second data processor for determining a common denominator for fractional representations of the respective commanded speeds and a secondary numerator difference between the corresponding observed speeds for the third time interval and the fourth time interval, a second ratio formed by the secondary numerator difference and the common denominator for the first motor;
the second persistence counter for incrementing a secondary persistence counter for the second motor if the second ratio increases during the series of time intervals; and
the second motor controller adapted to estimate a first motor deceleration or first motor rate of change in first rotor speed of the first motor if the second ratio exceeds a stall limit count, the second motor controller adapted to adjust a target rotor speed of a second motor based on the estimated first motor rate of change to counteract or oppose the first motor rate of change.

20. The system according to claim 12 wherein the first persistence counter for the first motor exceeds a stall limit value is indicative of the first motor approaching or being at a stall mode.

21. The system according to claim 16 wherein:
the second data processor of the second motor controller adapted to determine the common denominator for fractional representations of the respective commanded speeds and a numerator difference between the corresponding observed speeds if a first current draw of the first motor is greater than a maximum allowable current draw, if a second current draw of the second motor is greater than a maximum allowable current draw, and if an observed speed is less than a commanded speed of the first motor for the first time interval and the second time interval.

* * * * *